May 20, 1941. A. T. FLETCHER 2,242,700
SCRAPER
Filed Jan. 23, 1939
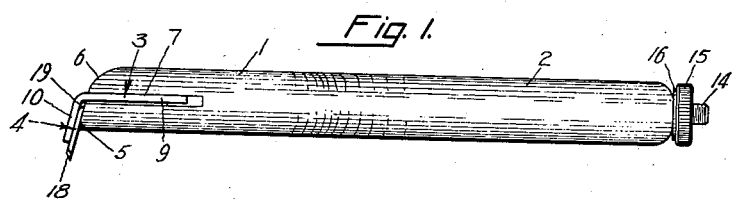
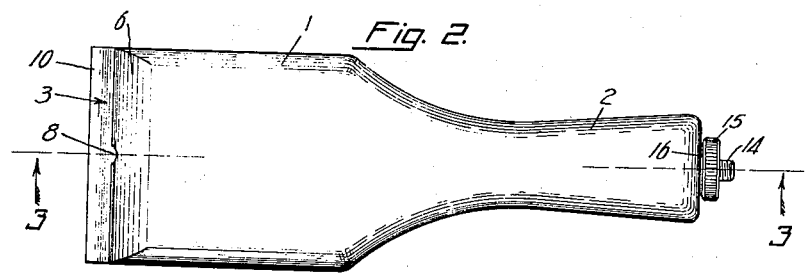
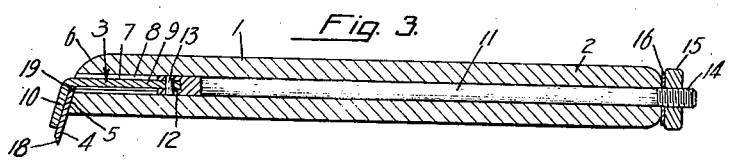
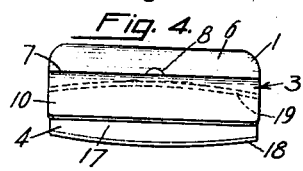
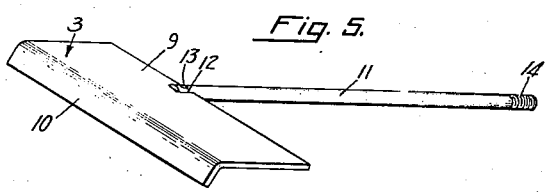
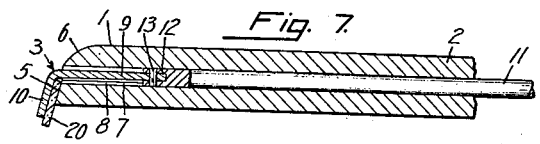
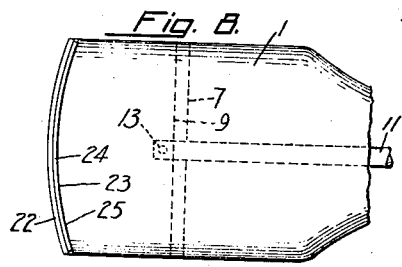
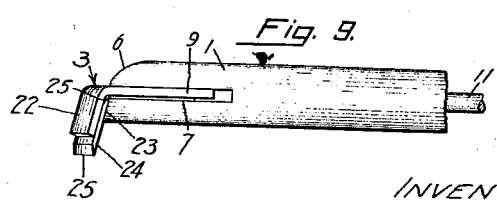
INVENTOR
Arthur T. Fletcher
By
ATTORNEY Patented May 20, 1941

2,242,700

UNITED STATES PATENT OFFICE 2,242,700

SCRAPER

Arthur Terry Fletcher, Bristol, Conn.

Application January 23, 1939, Serial No. 252,277

9 Claims. (Cl. 30—171)

My invention relates to scrapers.

It has among its objects to provide an improved scraper and, more particularly, such a scraper adapted to use in cabinet work or in scraping floors, paint, varnish, or the like. Further objects of my invention are to provide such an improved scraper having improved blade holding means whereby the scraping blade is adapted to be securely held, while at the same time being readily and quickly released when desired, and further to provide such improved holding means including an improved blade engaging member carried in an improved manner by, and longitudinally adjustable in an improved manner relative to, an improved cooperating blade engaging holder or handle member. A still further object of my invention is to provide an improved scraping blade cooperating in an improved manner with said blade engaging members and also of improved construction and capable of being inexpensively provided and of being readily reversed or substituted in my improved holding means. These and other objects and advantages of my improved construction will, however, hereinafter more fully appear.

In the accompanying drawing, I have shown for purposes of illustration certain embodiments which my invention may assume in practice.

In the drawing:

Figure 1 is a side elevation of one form of my improved scraper;

Fig. 2 is a top plan view of the latter;

Fig. 3 is a longitudinal sectional view on line 3—3 of Figure 2;

Fig. 4 is an end elevation of the construction shown in Figure 1, the view being taken from the blade carrying end thereof;

Fig. 5 is a perspective view of the adjustable blade holding member removed from the scraper handle;

Fig. 6 is a plan view of the metal scraper blade;

Fig. 7 is a view similar to Figure 3 but showing a modified construction wherein a glass blade is used;

Fig. 8 is a bottom view of a modified construction utilizing a flexed metal blade, and Fig. 9 is a side elevation of the construction shown in Figure 8.

In the illustrative construction shown in Figures 1 to 6, it will be noted that I have shown a scraper including a holder 1 having a rearwardly extending grasping portion 2 and an improved blade engaging member, generally indicated at 3, and cooperating with the holder 1 in positioning a scraper blade, generally indicated at 4, as hereinafter described.

Referring more particularly to the holder 1, it will be noted that the same herein is of generally block or board-like form at its front end and formed of wood. Herein, although not limited thereto, it is also provided with flat top and bottom surfaces and is of such width at its front or working end as to extend throughout the width of both the blade engaging member 3 and blade 4, while being adapted to be comfortably pressed downward with one hand while the other hand grasps the rear end of the holder. Further, it will be observed that the holder is provided on its front or working end with a downwardly and forwardly sloping transversely disposed end surface 5 adapted to provide an abutment for the blade 4 and disposed at a proper angle to permit the latter to function satisfactorily. Obviously, the form of the rear end or grasping portion 2 of the holder 1 may be varied, but it will be noted that herein it includes a so-called paint brush handle, while the top of the holder 1 is rounded at its front end above the surface 5, as shown at 6, to permit the fingers to overlie the same and also to enable the blade 4 when necessary to be used in close quarters, as, for example, close to a side wall, or the like. Herein, it will also be observed that the holder 1 is provided with a kerf or slot 7 extending from its front end substantially half-way to the handle portion 2, this slot 7 being transversely disposed and preferably of the full width of the body portion 1. As shown, this slot 7 is also disposed horizontally of the holder 1 and midway between the portions 5 and 6. Further, an axial bore or aperture 8 extends from the front end of the holder 1 horizontally and centrally through the holder and the handle 2, in order to receive a portion of the holding member 3 as hereinafter described.

Cooperating with this holder 1 is also the improved holding member 3. The latter, as shown, includes a rigid plate 9 having a flat body received in the slot 7 but slightly thinner than the latter and herein disposed with its upper surface in contact with the top surface of the slot 7, and its bottom surface spaced slightly above the bottom surface of the slot. Further, it will be observed that a rigid angularly related and depending blade engaging flange 10 is provided along the front edge of this plate 9 parallel to the end surface 5 on the holder 1 and herein extending down slightly below the bottom of the latter. As shown, the plate 9 is also provided with a rearwardly extending and centrally located rod 11 receivable lengthwise in the front end of the bore or aperture 8 and extending through the latter and the handle 2. In a preferred construction, this rod is provided with a transverse slot 12 in its front end receiving the adjacent rear end of the plate 9 and suitably connected thereto as by a rivet or pivot pin 13, while the rear end of the rod 11 is threaded as shown at 14 to receive a knurled holding nut 15 and cooperating washer 16 between the latter and the extremity of the handle 2. Thus, it will be observed that when the nut 15 is moved in one direction, the blade engaging flange 10 on the plate 9 may be adjusted as desired toward the cooperating surface 5 on the holder 1 to clamp the blade 4 therebetween, while upon opposite rotation of the nut 15, the whole holding member 3 will be released so that it may be readily moved longitudinally relative to the holder 1, as, for example, by pressing longitudinally on its threaded end, in such manner as to release the blade 4. Here, attention is also directed to the fact that as in a preferred construction, the plate 9 is of such length that its rearmost edge is spaced from the inner edge of the slot 7 in such manner that a very effective clamping action between the flange 10 and the blade is obtained. Further, it will be observed that, due to the space between the bottom of the plate 9 and the bottom of the slot 7, the holding member 3 is readily movable longitudinally in the slot.

Cooperating with the holder 1 and blade engaging member 3 is also the improved blade 4. The latter, as shown, has a flat imperforate body 17 formed of suitable relatively stiff blade steel and adapted to be clamped throughout its length between the flange 10 on the blade engaging member 3 and the cooperating surface 5 on the holder 1. In a preferred construction, this blade 4 is substantially as long as the flange 10 and over three times as long as it is wide. At the same time, its width is such that it not only extends over the full area of the surface 5 on the holder 1, but also extends below the depending edge of the flange 10, as illustrated in Figure 3. Thus, the straight flat blade is effectually clamped to the holder 1 between the like surface on the flange 10 and the like front end surface 5 on the holder 1, while also being reenforced by the depending portion of the flange 10 to a point below the latter and closer to the cutting edge of the blade, and yet exposing a sufficient portion of the blade below that depending portion to enable the blade to function effectively during scraping. Moreover, it will be observed that the cutting edge 18 on the blade is arcuate in shape and beveled on its front edge in such manner as to provide a very effective scraping edge. Further, it will be observed that the opposite edge of the blade is provided with a like arcuate but oppositely disposed and beveled cutting edge 19. Thus, in my improved construction, it is made possible to provide a very simple and inexpensive oval blade formed of imperforate sheet steel, which is not only adapted to be securely positioned between the flange 10 and surface 5, but further has its cutting edges disposed in the plane of the body of the blade in such manner as, while producing a very effective reversible blade, to enable the same to stand up well during service and withstand repeated sharpenings, at the same time that the blade may be very inexpensively produced and quickly and readily inserted and removed from the scraper upon tightening and releasing the nut 15.

In the use of my improved construction, it will be evident that with the parts assembled as shown in Figures 1, 2 and 3, the scraper may be used very conveniently, as, for example, with one hand pressing on the top of the holder 1 and the other grasping the handle 2. Further, the blade 4 between the flange 10 and the surface 5 then has its cutting edge which is not in use then in suitably spaced relation below the plate 9 while the flat body 17 of the blade is then very securely gripped throughout its length between the adjacent surfaces of the flange and body. Attention here is also directed to the reenforcing effect of the depending portion of the flange and to the secure positioning of the entire member 3 in my improved construction. When, however, it is desired to reverse the blade, it is only necessary to release the nut 15, whereupon the blade 4 may be readily withdrawn or the member 3 may be reciprocated longitudinally, whereupon the blade will drop out. Obviously, upon reversing the blade or inserting a new blade, it is only necessary to rotate the nut 15 suitably in order again to clamp the parts securely together.

As a result of my improved construction, it will be observed that all necessity for providing blades of special and expensive construction having offset opposite cutting edges, is eliminated at the same time that I eliminate all need for special construction of the holding member to accommodate the offset cut edge not in use. Also, it will be evident that while having two cutting edges, the construction is such as to require only one blade and to enable this blade to be of exceedingly sturdy and readily resharpened type adapted to stand up under repeated resharpening, while the same requires only a minimum of metal, all in such manner as to enable the blade to be manufactured and furnished as replacements at very small expense. These and other advantages of my improvements will, however, be clearly apparent to those skilled in the art.

In Figure 7, I have shown a modified form of blade which may be used in my improved construction. This blade is in the form of an oblong strip of glass 20 having straight or parallel cutting edges, as distinguished from the opposite arcuate cutting edges of the oval metal blade 4, previously described. Here, it will be noted that the glass blade will also be securely clamped in cutting position in my improved construction in such manner as to maintain the same free from breaking strain, while protecting it, and thereby enabling the same to be effectively used with the same holder where conditions are such as to enable a straight glass blade to be effective. In Figures 8 and 9, I have shown a further modified construction which may be used as desired. In this construction, both the flange on the blade engaging member 3, indicated at 22, and the cooperating surface on the front end of the holder 1, indicated at 23, are disposed in an arc struck about a rearwardly located upright axis, as distinguished from being straight and parallel as heretofore described. Further, they cooperate with a transversely flexed flexible metal blade 24 having straight opposite cutting edges 25, as distinguished from the oval metal blade having the arcuate opposite cutting edges heretofore described.

While I have herein specifically described certain forms which my invention may assume in practice, it will be understood that these forms of the same have been shown for illustrative purposes, and that my improved construction may be modified and embodied in various other forms without departing from its spirit or the scope of the appended claims.

What I claim as new and desire to secure by Letters Patent is:

1. In a scraper, a holder block having a transverse kerf in its front end and a transversely disposed and elongated narrow edge portion below said kerf, blade clamping mechanism including a holding member carried in said kerf and projecting forwardly from said edge portion and having a transversely elongated narrow depending portion in clamping relation in front of said edge portion, and a transversely elongated narrow scraper blade disposed beneath the forwardly extending portion of said holding member and clamped between said depending and front edge portions.

2. In a scraper, a holder block having a transverse kerf in its front end and a transversely disposed and elongated narrow edge portion below said kerf, blade clamping mechanism including a holding member carried in said kerf and projecting forwardly from said edge portion and having a transversely elongated narrow depending portion in clamping relation in front of said edge portion, and a transversely elongated narrow scraper blade disposed beneath the forwardly extending portion of said holding member and clamped between said depending and front edge portions, said kerf being of substantially the same width as said depending portion and blade.

3. In a scraper, a holder block having a transverse kerf in its front end and a transversely disposed and elongated narrow edge portion below said kerf, blade clamping mechanism including a holding member carried in said kerf and projecting forwardly from said edge portion and having a transversely elongated narrow depending portion in clamping relation in front of said edge portion, and a transversely elongated narrow scraper blade disposed beneath the forwardly extending portion of said holding member and clamped between said depending and front edge portions, said depending and front edge portions being arcuate and struck about a common axis in rear thereof and sloping downwardly and forwardly and said blade being correspondingly curved and clamped between said depending and front edge portions.

4. In a scraper, a holder block having a wide working end and a transverse kerf in the latter extending rearwardly from said working end and completely across said end, blade clamping mechanism including a holding member carried on said block in said kerf and having a clamping portion of substantially the width of said kerf extending across said block in front of said working end and depending below the mouth of said kerf, and a transversely elongated narrow scraper blade of substantially the width of said kerf and clamped substantially throughout its length between said depending portion and the front end portion of said holder below said kerf.

5. In a scraper, a holder having a board-like working end and a transverse kerf in said end extending longitudinally of the holder from said end and transversely of said end, and also having a sloping front edge portion beneath said kerf, a holding plate in said kerf projecting therefrom and spaced from the rear end of the latter and having a depending portion outside said sloping edge portion, and means acting on said holding plate and said holder for clamping a blade between said front edge and depending portions while said holding plate remains spaced from the rear end of said kerf.

6. In a scraper, a holder having a rearwardly extending handle and a front relatively wide board-like working end and a transverse kerf in said end extending longitudinally of the holder from said end and completely across said holder transversely of said end and also having a sloping edge portion beneath said kerf, a blade holding plate in said kerf projecting therefrom and spaced from the rear end of the latter and having a depending clamping portion in front of and depending below said sloping edge portion and of substantially the width of said kerf, and means for adjusting said blade holding plate longitudinally of said holder and into and out of blade clamping position on said holder while said handle remains stationary and said holding plate remains spaced from the rear end of said kerf.

7. In a scraper, a holder having a handle and a relatively wide transverse front end and a transverse kerf extending longitudinally of the latter and a centrally located longitudinally disposed bore extending through said kerf, a blade holding plate receivable in said kerf and projecting therefrom and having its rear end spaced from the rear end of said kerf and a centrally located rearwardly extending rod connected to the rear end of said plate and receivable in said bore and a depending front flange portion on said front plate outside said front end and extending below the latter, and means acting on said rod and having an abutment against a portion of said holder for clamping and releasing said blade holding plate.

8. A holder member for scrapers comprising a horizontal plate having integral therewith a depending downwardly and forwardly projecting flange on its front edge and an extension disposed substantially in the plane of said plate and on the rear edge thereof and rigidly and centrally connected thereto and projecting rearwardly therefrom.

9. A scraper having a wide working end of generally board-like form, a transverse lower front edge on said working end forming a blade abutment, a transverse upper front edge on said working end, and a transverse kerf extending completely across said working end and rearwardly from said front edges and between and substantially parallel to the top and bottom surfaces of said working end.

ARTHUR TERRY FLETCHER.